United States Patent [19]

Mason

[11] 4,212,528
[45] Jul. 15, 1980

[54] PHOTOGRAPHIC FILM CASSETTE HAVING PRESSURE PAD AND NOZZLE ARRANGEMENT

[75] Inventor: Paul B. Mason, Magnolia, Mass.
[73] Assignee: Polaroid Corporation, Cambridge, Mass.
[21] Appl. No.: 12,344
[22] Filed: Feb. 15, 1979
[51] Int. Cl.² ............................................. G03B 17/50
[52] U.S. Cl. .................................... 354/317; 354/88; 352/130
[58] Field of Search ............... 354/88, 317; 352/78 R, 352/130, 72

[56] References Cited

U.S. PATENT DOCUMENTS

| | | |
|---|---|---|
| 3,120,795 | 2/1964 | Land . |
| 3,748,994 | 7/1973 | Stella . |
| 3,782,263 | 1/1974 | Land . |
| 3,871,013 | 3/1975 | Burke et al. ......................... 354/317 |
| 3,951,530 | 4/1976 | Czumak et al. ....................... 352/130 |
| 4,003,064 | 1/1977 | Mason ................................... 354/317 |

Primary Examiner—L. T. Hix
Assistant Examiner—Alan Mathews
Attorney, Agent, or Firm—Leslie J. Payne

[57] ABSTRACT

Method and apparatus for reducing frictional drag on a strip of photographic film moving in a film cassette between a pressure pad and a fluid processor nozzle, and for more effectively controlling the processing fluid thickness on the moving film. Formed on such a nozzle is at least a pair of pressure pad engaging surfaces spaced laterally beyond the film's longitudinal margins so as to cooperatively engage with a pair of generally correspondingly spaced nozzle engaging surfaces of the pressure pad. Between the nozzle engaging surfaces on the pressure pad is at least one raised film supporting member. Such film supporting member can support the film in a predetermined spaced relation to the nozzle so that the film need not engage the nozzle while spacing the film's edge rails from the remainder of the pad.

6 Claims, 6 Drawing Figures

PHOTOGRAPHIC FILM CASSETTE HAVING PRESSURE PAD AND NOZZLE ARRANGEMENT

BACKGROUND OF THE INVENTION

This particular invention relates generally to photographic film processing and, more particularly, it concerns a method and photographic film cassette having an improved pressure pad and cooperating fluid processing applicator nozzle for reducing frictional drag on a strip of traveling film and for better controlling the processing fluid thickness on the film.

Multipurpose film cassettes have been developed in which a strip of photographic film is operated so as to be exposed, processed and projected while being at all times in the cassette. Film cassettes of this type are disclosed in several U.S. patents assigned in common with the present invention.

In film cassettes of this category, a supply of light sensitive photographic film can be selectively exposed in a camera particularly adapted to receive and operate the cassette. To process or develop the exposed film, the cassette is removed from the camera and placed in a player or processing and viewing apparatus capable of activating a cassette contained processor for depositing a desired uniform layer of processing fluid on the film's exposed emulsion surface. During such processing a conventional series of successive, positive transparent images on the exposed film is developed. Following processing in the manner indicated, the player apparatus is operated as a projector. During projection, the film is incrementally advanced, frame-by-frame, past a light source. Accordingly, the series of positive transparent images of the scenes to which the film were exposed are capable of being successively viewed while being projected onto a screen.

Towards the end of achieving the desired fluid thickness on the film strip the cassette contains a spring-biased pressure pad for supporting the film including its longitudinal edge rails between the pad and a fluid processor nozzle structure. As so supported, the film strip is directly sandwiched by and between the pressure pad and the nozzle. In this manner, the film's emulsion surface is urged into a predetermined position against the nozzle, whereby it has a uniform and spaced relation to a doctoring surface of the nozzle for effecting formation of the desired thickness, as well as for minimizing film distortion during fluid application. To facilitate continuous formation of the desired thickness, the doctoring surface, which is positioned downstream of a nozzle opening in the direction of film advancement during processing, is constructed to develop positive hydrodynamic pressures in the deposited fluid flowing therepast so as to force the strip into engagement with the pressure pad. Hydro-dynamic pressures, however, tend to force the film strip away from the doctoring surface. To resist this tendency, the spring biasing the pressure pad is constructed to maintain the emulsion surface in its predetermined position relative to the doctoring surface despite the hydrodynamic forces.

While the spring biased pressure pad and nozzle are successful for positioning the film strip in the intended manner, several drawbacks arise from their use. These are attributable to the fact that the film including longitudinal edge rails is sandwiched directly between the pressure pad and nozzle. One disadvantage is that the spacing desired to bring about the desired fluid thickness can vary in accordance with the thickness variations of the film's longitudinal edge rails. In this context should the film rails be thicker than intended, the pressure pad will be positioned farther from the doctoring surface. Consequently, spacing between the doctoring surface and image areas of the film's emulsion surface will be increased, thereby undesirably increasing processing fluid thickness. On the other hand, should the film rails be thinner than intended, the pressure pad, owing to its biasing spring, will force the strip closer to the doctoring surface, whereby the pressure pad will cause the latter to be bowed towards the doctoring surface. This has the effect of reducing the gap spacing between the image area on the film's emulsion surface and the doctoring surface and, thereby, reducing the desired fluid thickness. It will be appreciated, therefore, that conventional pressure pad and nozzle arrangements fail to prevent spacing variations between the emulsion layer and the doctoring surface caused by thickness changes of the film, particularly changes in the film's edge rails. Such variations lead to unintended and uneven fluid distribution on the film and thus blemishes in the projected images.

Moreover, the foregoing approach suffers from the fact that relatively high amounts of friction are developed during film strip advancement in either the exposure or processing modes. Increased friction results in increased power requirements during exposure and, thus, shortens useful life of the camera's relatively weak battery power. Also, excessive friction of this type increases film web tension during film strip processing when the cassette is in the player apparatus for processing. Increased tension causes a tight wind on the winding spool, thereby inviting slippage or cinching between adjacent wraps or convolutions of film so that contact between the wraps becomes a problem. Such contact results in processing defects since the freshly deposited processing fluid layer is damaged.

It follows, therefore, that substantial reductions in the drag encountered by a film and the spacing variations of the image area relative to the doctoring nozzle are the focal points of attention to overall system development.

Moreover, the problems of avoiding relatively high frictional drag on the film and irregular coating thickness are further compounded by the requirement the cassette and its components including the pressure pad and fluid processor nozzle structure must be capable of mass production manufacturing techniques as well as be within tolerance levels incident to such techniques for the system to be acceptable in a competitive commercial market. Accordingly, the structional organization of components by which the film is supported in predetermined relationship to the doctoring surface is important to the overall system.

SUMMARY OF THE INVENTION

In accordance with the present invention, the potential for problems associated with relatively high frictional drag on a strip of photographic film in a film cassette and variations in spacing of the image area of the film from the doctoring surface of the nozzle structure caused by film thickness variations are substantially eliminated. Elimination is brought about by the provision of an improved pressure pad and nozzle arrangement in a film cassette.

As in prior film cassettes a nozzle structure is provided having an opening through which processing fluid is deposited onto an emulsion surface of a photographic film strip advancing beneath the nozzle opening in a given direction. For facilitating formation of a uniform layer on the emulsion surface, a doctoring surface formed on the nozzle is positioned downstream of the nozzle opening in the given direction and is spaced from the emulsion surface by a predetermined distance. As a result, the desired fluid processing thickness is attainable.

In an illustrated embodiment of this invention, the nozzle structure at least has a pair of pressure pad engaging surfaces. Each one of these pad engaging surfaces is spaced laterally beyond a corresponding longitudinal margin of the film for cooperatively engaging with a pair of generally correspondingly spaced nozzle engaging surfaces provided on the pressure pad. Between the nozzle engaging surfaces is a raised film supporting surface. This film supporting surface is constructed so that the film's longitudinal margins are simultaneously elevated from the remainder of the pad and the emulsion surface is urged toward the predetermined spaced relation relative to the doctoring surface while the pressure pad and nozzle engaging surfaces are in engagement. As a result of this structural arrangement, thickness variation of the film and, in particular, the film's edge rails thickness will not cause said pad to substantially move either towards the nozzle under the urging of the pressure pad spring or away from the nozzle against the bias of such spring. Thus, the film is not squeezed or sandwiched between the nozzle and pad by the pressure pad spring so as to act as a spacer therebetween. Accordingly, there is a significant reduction in the amount of friction on the film strip. Also, significantly, variations of the film's thickness tolerances will not alter the conventional gap spacing between the film's image area and the doctoring surface.

Among the objects of the invention are, therefore, the provision of an improved pressure pad and nozzle structure for use in a multipurpose photographic film cassette for reducing friction on a traveling film strip and for better controlling the desired spatial relationship between the fluid processor doctoring surface and image areas of the film; and the provision of an improved method, whereby the film strip is supported between a pressure pad and a fluid processor nozzle structure, for minimizing frictional drag on the strip, while simultaneously better controlling the spacing between the film's image areas and the doctoring surface despite thickness tolerance variations of the film strip.

Other objects and further scope of applicability of the present invention will become apparent from the detailed description to follow when taken in conjunction with the accompanying drawings wherein like parts are designated by like reference numerals.

DETAILED DESCRIPTION OF A PREFERRED EMBODIMENT

Figure 1:
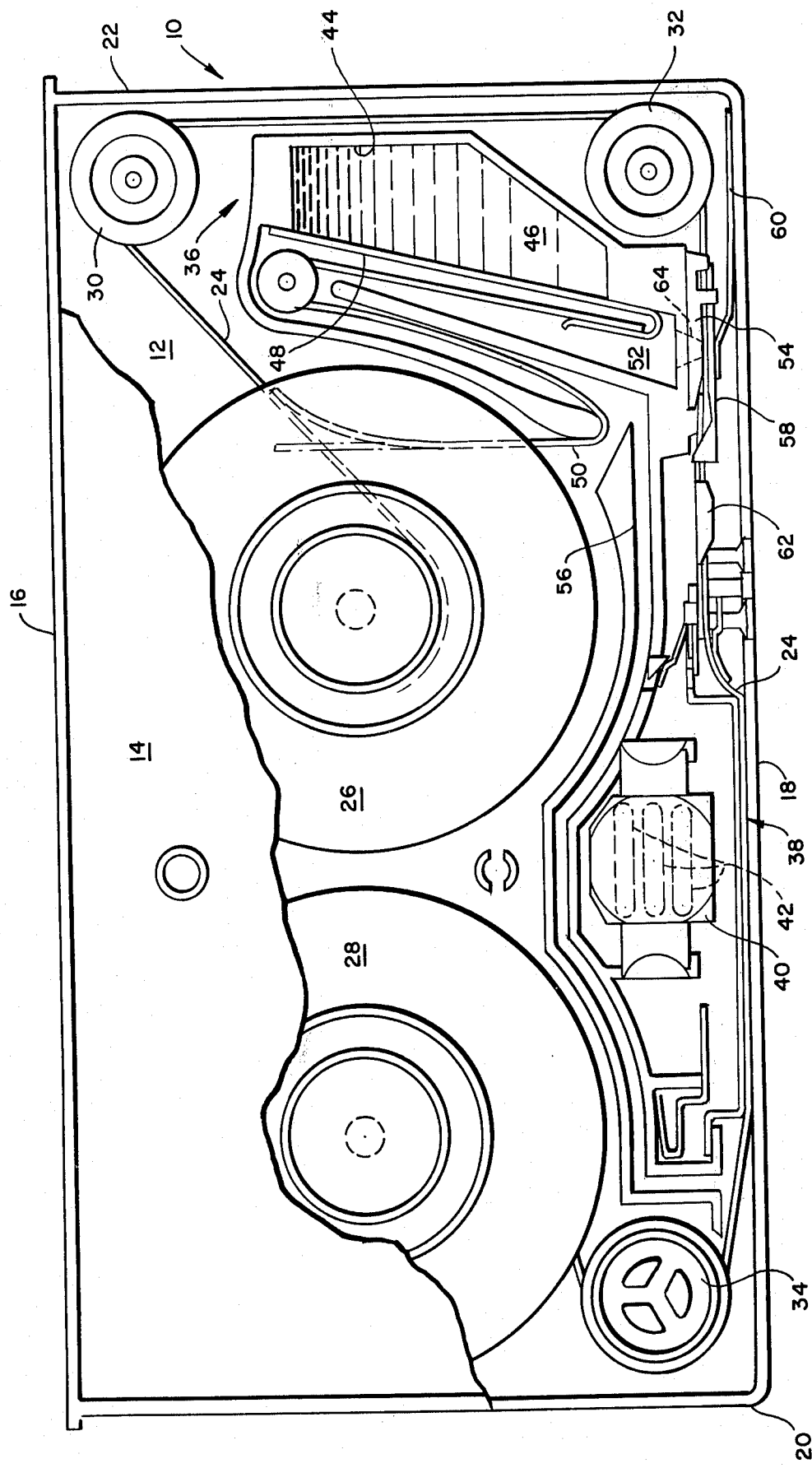
FIG. 1 is a side elevation view, partially broken away, illustrating the interior of a film cassette incorporating the present invention.

In FIG. 1 of the drawings, a multipurpose film cassette incorporating the principles of the present invention is shown to include a housing 10 which takes the form of a rectangular parallelepiped having a pair of exterior side walls 12 and 14 connected together by top, bottom and end walls 16, 18, 20 and 22, respectively. Within the housing 10, a film strip 24 is connected at opposite ends to supply and take-up spools 26 and 28, respectively, for movement through a series of linear flights or runs defined by a bobulator roller 30, an idler or guide roller 32 and a snubber roller 34. When the film strip 24 runs between the guide roller 32 and snubber roller 34, in passing from the supply spool 26 to the take-up spool 28, it traverses a processor 36 and an exposure/projection aperture 38 formed in the bottom housing wall 18 under a reflecting prism 40 located adjacent ventillating openings 42 in the side wall 12.

Included in the processor 36 is a reservoir or pod 44 of processing fluid 46 initially sealed by a tear strip 48 which is connected to a film strip engaging pull strip 50. It is pointed out that the construction and operation of the pull strip 50 is adequately disclosed in U.S. Pat. No. 3,895,862 issued July 22, 1975 to Joseph A. Stella et al. Therefore, the pull strip 50 need not be further described here except to note that upon initiation of a processing cycle, it becomes engaged by an aperture (not shown) in the end portion of the film strip 24 to peel the tear strip 48 away from the pod or reservoir 44. As a result, the processing fluid 46 is allowed to flow into a chamber 52 closed at its bottom by an applicator nozzle structure 54. At the completion of the tear strip removal operation, the pull strip 50 becomes wound between the convolutions of the film strip 24 on the supply spool 26, whereas the tear strip 48 becomes separated and remains in the storage chamber 56.

Also, in accordance with the disclosures of prior patents, including the one mentioned above, as the film strip 24 runs between the rollers 32 and 34, it passes between the bottom of the nozzle 54 and a pressure pad 58 biased upwardly by a spring 60 supported in the bottom wall 18 of the housing 10. The spring 60 is specifically designed to provide a net balance of forces on the film strip.

In this connection, the biasing force of the spring 60 is selected so that the emulsion layer E of the film strip 24 is slidably engaged on the underside of the nozzle 54 even during development of hydrodynamic forces in the processing fluid 46 which tend to urge the film strip 24 and the pressure pad 58 away from the nozzle. As a result of this, a net balance of forces on the film strip 24 is achieved, whereby foreign particles, such as dust or the like, on the surface of the emulsion layer E will effect a slight instantaneous increase in the gap between the doctoring surface on the nozzle and the emulsion layer. Such increase allows the foreign particles to pass beneath the nozzle. Thus, the trapping of foreign particles is substantially eliminated. Positioned upstream of the nozzle 54 (in the context of film strip travel during rewinding or processing, as indicated in FIG. 2 by arrow 61) is a valve member 62, which is engageable by a necked-down portion, not shown, in the leading end portion of the film strip 24 so as to be advanced from the position shown to a position, not shown, underlying the nozzle 54 at the end of the processing cycle.

Figure 2:
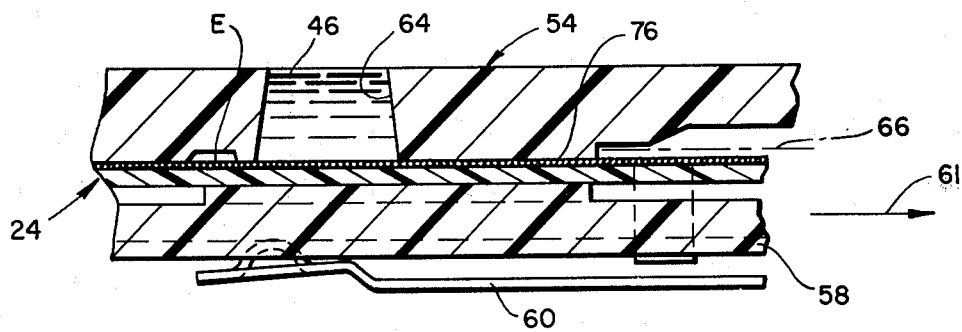
FIG. 2 is an enlarged cross-section view showing the cooperation between the improved nozzle structure of the fluid processor and the improved pressure pad.
Figure 4:
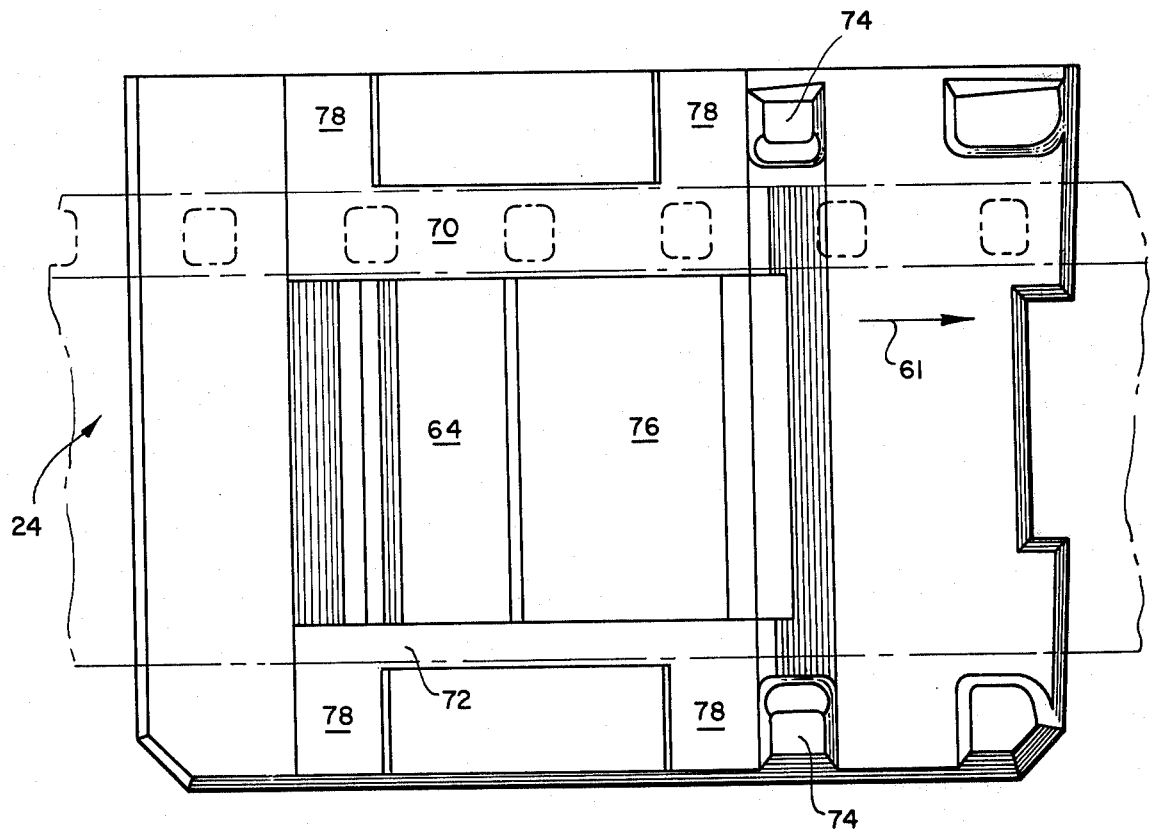
FIG. 4 is an enlarged bottom plan view of the processor nozzle which also illustrates in phantom lines the film strip.

An understanding of the nozzle 54 and its use in operation may be gained by continued reference to the drawings and, in particular, FIGS. 1, 2 and 4. In this embodiment, the nozzle 54 is an integral molding of suitable synthetic resinous material. Extending through the nozzle 54 from top to bottom is a generally rectangular shaped nozzle opening 64 through which the processing fluid 46 is deposited onto the upper surface of an emulsion layer E carried by and extending across the width of a carrier base B having a dry, non-emulsion, back surface.

Figure 3:
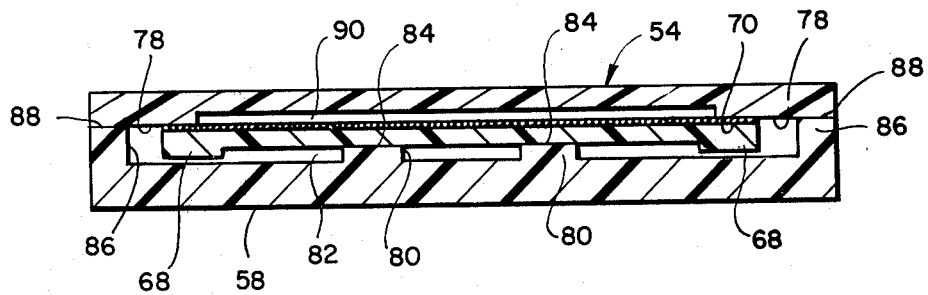
FIG. 3 is an enlarged cross-section view better illustrating the cooperation between the pressure pad and nozzle structure shown in FIG. 2.

Prior to completing the description of the nozzle 54, it is important to note that the deposited layer 66 (FIG. 2) of the processing fluid 46 be protected from disturbance until completely dried. Such protection is provided by a pair of longitudinal edge rails 68 affixed to the underside of the film strip 24 for spacing adjoining convolutions of such strip when wound, in its wetted condition, onto the supply spool 26. A film strip having such a configuration is described and claimed in U.S. Pat. No. 3,782,263 entitled "Photographic System Employing Film Margin Rails" of E. H. Land et al. and assigned to the assignee of the present application and is best shown in FIG. 3.

Returning to the nozzle 54, the surface configuration of its underside which faces the film strip 24 is best shown in FIG. 4. Forming such underside is a pair of elongated spaced apart and coplanar guide tracks or film engaging lands 70 and 72 provided on the opposite sides or lateral edges of the nozzle opening 64. These lands 70, 72 are oriented to be in overlying relation to and in sliding contact with the longitudinal margins of the emulsion layer E. Although this embodiment discloses direct engagement between the emulsion layer E and the lands 70, 72, this invention contemplates that the emulsion layer can be slightly spaced from the lands consistent with avoiding significant processing fluid leakage along the longitudinal margins. Thus, there is a reduction of friction.

As a result, the emulsion layer E is supported relative to the nozzle 54 so as to facilitate formation of a uniform and relatively thin processing fluid thickness. Also, the film engaging land 70 is wider than the film engaging land 72 so as to better accommodate the feed apertures in the film strip 24 which pass therebeneath. Depending from the underside of the nozzle 54 is a pair of post-like abutments 74 which laterally guide the film strip 24 past the nozzle 54 and also act to stop the valve member 62.

With reference again to FIGS. 2 and 4, it will be seen that the nozzle 54 is also formed with a doctoring surface 76 shown to be located downstream of the nozzle opening 64; as viewed in the context of film strip advancement in the processing or rewind direction 61. In the illustrated embodiment, the doctoring surface 76 is formed by a generally planar, inclined surface extending transversely between the film engaging lands 70 and 72. Further, the doctoring surface 76 extends from a leading edge adjacent the downstream edge of the nozzle opening 64 to a trailing edge terminating above the film engaging surface of the film engaging lands 70 and 72 and upper surface of the emulsion layer E by a preselected distance. This spacing effects formation of the uniform processing fluid coating 66. As constructed the doctoring surface 76 facilitates maintaining the non-emulsion surface of the film strip 24 in continuous engagement with the pressure pad 58 during processing. This is because the doctoring surface 76 develops, in known fashion, a desired positive hydrodynamic pressure gradient in the processing fluid 46 passing therepast. Such pressure increases in the rewind direction 61.

Referring back again to the nozzle 54, reference is made in particular to FIG. 4 wherein the improved features thereof are best seen to be defined by a pair of generally square-shaped, linearly spaced apart and planar pressure pad engaging surfaces 78 on each side of the guide tracks 70 and 72. Preferably, each of the pressure pad engaging surfaces 78 are coplanar and coextensive to the guide tracks 70 and 72. For facilitating direct engagement with the pressure pad 58 in the manner intended by this invention, it will be noted that the pressure pad engaging surfaces 78 are spaced laterally of the film strip 24.

Now specifically referring to the pressure pad 58 it will be understood that those known constructional features not necessary for an understanding of the invention will be dispensed with. In this regard, the improved pressure pad 58 will be seen to include a pair of film supporting members 80 extending upwardly from a generally planar surface 82. Each of the film supporting members 80 has a narrow, elongated film engaging surface 84 for slidably engaging the non-emulsion surface of the film strip 24. Reference is made to FIG. 2 for best illustrating the spatial orientation and axial extent of the film engaging surfaces 84 with respect to the film strip 24 and the nozzle structure 54 so as to support the entire length of the incremental section of the film strip 24 which is at any time passing by the nozzle doctoring surface 76. The width of the film engaging surfaces 84 is appropriately selected to maintain the incremental film portions passing under the nozzle/doctoring surface 76 in the desired spaced and planar relationship thereto. Also, the film engaging surfaces 84 are raised relative to the planar surface 82 so as to be greater in height than the film's edge rails 68 are thick. Consequently, the edge rails 68 will avoid contacting the planar surface 82. This has the advantage of considerably minimizing the exertion of friction on the advancing film strip 24.

Figure 5:
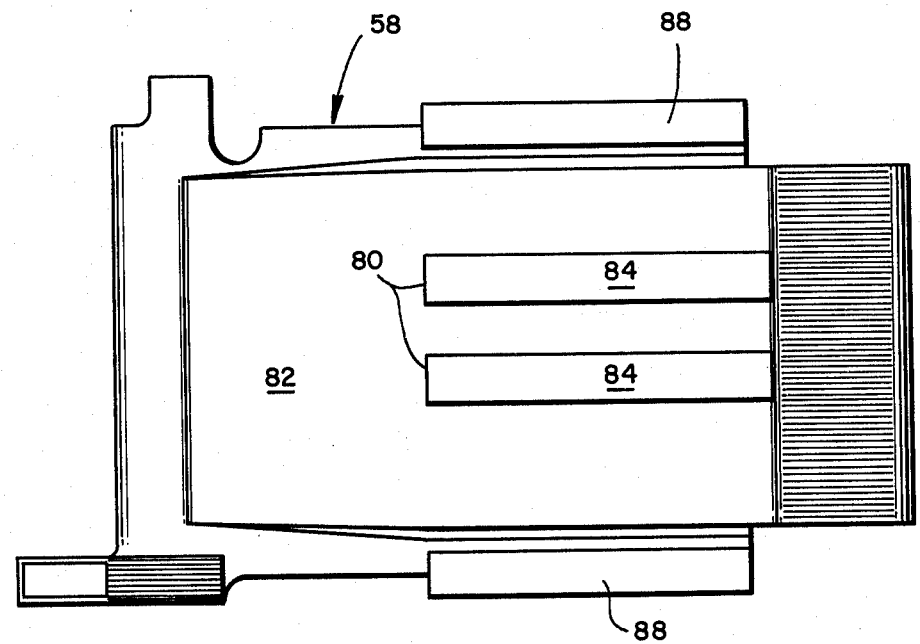
FIG. 5 is an enlarged top plan view of the improved pressure pad of the present invention.
Figure 6:
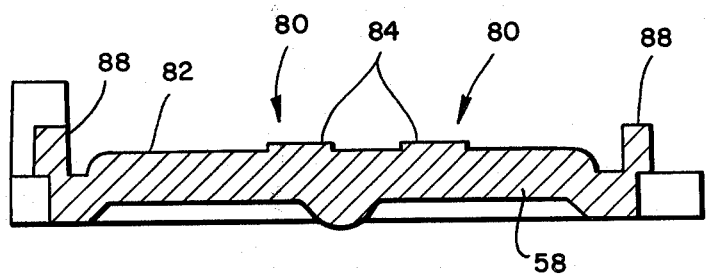
FIG. 6 is a cross section view of the pad.

As is best shown in FIGS. 3 and 5, each longitudinal edge of the pressure pad 58 is provided with an elongated nozzle engaging member 86 having a nozzle engaging surface 88 elevated relative to the planar surface 82 by a distance allowing full contact or engagement with the pressure pad engaging surfaces 78 whenever the film strip 24 passes between the nozzle 54 and the pressure pad. To effect such engagement, of course, the nozzle engaging surfaces 88 are spaced laterally of the film's longitudinal margins by a distance which generally corresponds to the spacing of the pressure pad engaging members 78, much as in the manner indicated in FIG. 3. Whenever the nozzle 54 and the pressure pad 58 are in the cooperative relationship shown in FIG. 3, they define a passageway 90 circumscribing the film strip 24. This passageway 90 facilitates advancement of the film strip 24. Furthermore, the nozzle engaging surfaces 88 and the film supporting members 80 are constructed and dimensioned to support the film strip 24 so that the longitudinal margins of the strip have a slidable, line-to-line, engagement with the film engaging lands 70, 72 while the nozzle engaging surfaces 88 engage the pressure pad engaging surfaces 78. In this fashion, the image areas of the exposed emulsion layer E will be continuously positioned in the desired spaced relation to the doctoring surface 76 when the nozzle 54 is engaged by the pressure pad 58. Owing to the foregoing construction, any thickness increases of the edge rails 68 will not be effective to force the film strip 24 away from the film engaging lands 70 and 72 against the bias of the spring 60. Alternatively, any thickness decreases of the edge rails 68 will not allow the spring 60 to urge the film strip further toward the doctoring surface 76 so as to decrease the gap spacing between such surface and the emulsion layer E. This is because of the engagement of the pressure pad and nozzle engaging surfaces 78 and 88, respectively, wherein the pressure pad 58 does not contact the edge rails 68. Consequently, there will not be any alteration of the gap spacing between the doctoring surface 76 and the emulsion layer E caused by edge rail thickness variations. Thus, the thickness of the fluid layer 66 is more uniformly controlled.

Although the foregoing construction avoids having the thickness of the layer 66 changed by variations in the edge rail thickness, it does not, however, prevent thickness variations of the planar film from affecting the thickness of the layer 66. In practice, thickness variations of the film strip 24 are considered insignificant in terms of adversely affecting the coating layer. Also, since the bottom of the edge rails 68 are spaced from the planar surface 82, there is a significant reduction in the frictional drag exerted on the film strip 24. As a consequence, less battery power is required to advance the film strip 24. Accordingly, the foregoing pressure pad 58 construction provides means for not only substantially reducing friction drag on the film strip 24, but also eliminating the adverse effects of the film edge tolerance variations on the spacing between the emulsion layer E and the doctoring surface 76.

To provide a more complete understanding of the cooperation between the improved nozzle 54 and the pressure pad 58 the overall operation of the system will be briefly explained. For exposing the film strip 24, the cassette housing 10 is placed within a camera (not shown) adapted to receive and operate the same. During camera operation, the emulsion layer E is exposed as it incrementally advances past the aperture opening 38 during travel from the supply spool 26 to the take-up spool 28. To process the thus exposed film strip 24, the housing 10 is removed from the camera and inserted into a specially constructed player apparatus (not shown) with means cooperable with various operating components of the cassette to operate the same in an initial processing mode and then a series of projecting modes. In the processing mode, the player operates the cassette housing 10 to rewind the film strip 24, whereby the pull strip 50 becomes engaged, in a known manner, by the film strip 24 to peel the tear strip 48 away from the pod or reservoir 44. Consequently, the processing fluid 46 flows through the nozzle opening 64 onto the emulsion layer E, whereby continued advancement of the film strip 24 past the doctoring surface 76 effects formation of the uniform layer 66.

Referring to FIGS. 2–4 and, in particular, to FIG. 3, it will be seen that as the film strip 24 advances across the nozzle opening 64 and the doctoring surface 76, it only contacts the film engaging surfaces 84 and the film engaging lands 70, 72. This amounts to a considerable reduction in friction on the film strip 24 as compared to conventional approaches. During such film strip advancement, any tolerance variations in the thickness of the edge rails 68 will not cause alteration of the gap spacing between the doctoring surface 76 and the emulsion layer E. This is because of the noted construction whereby the spring 60 does not directly squeeze the film strip 24 between the pressure pad 58 and the nozzle 54, but rather forces the pressure pad engaging surfaces 78 into engagement with the nozzle engaging surfaces 88, while the film strip 24 is continuously supported in sliding engagement with the film engaging lands 70 and 72 so as to maintain the emulsion layer E in the desired spaced relation to the doctoring surface 76. Accordingly, a uniform distribution of the processing fluid 46 on the emulsion layer E is obtainable. Also, since the bottom of the edge rails 68 are spaced from the planar surface 82 not only does less friction result, but the adverse effects of any increase in edge rail thickness will not increase the noted gap spacing. Thus, the desired gap spacing between the image areas of the film strip 24 and the doctoring surface 76 can be better controlled insofar as any thickness variations in the edge rails will not cause deviations in the desired gap spacing. Thus, there is better control of processing fluid coating uniformity. As noted the invention contemplates having the emulsion layer slightly spaced from the lands. Also, less friction results in an increased battery life for those batteries useful in driving the film strip 24. Moreover, reduced friction leads to reduced film web tension and tight winding. Thus processing fluid defects caused by such tight winding leading to contact between the convolutions of the film layers are avoided.

Thus, it will be appreciated that as a result of this invention an improved nozzle and pressure pad structure are provided for photographic film strip processors and by which the above-mentioned objectives are completely fulfilled. Also, it will be apparent to those skilled in the art that modifications and/or changes may be made in the illustrated embodiment without departure from inventive concepts manifested thereby. Accordingly, it is expressly intended that the foregoing description is of a preferred embodiment only, not limiting, and that the true spirit and scope of the present invention be determined by reference to the appended claims.

What is claimed is:

1. In a film cassette containing a movable strip of photographic film having an emulsion surface thereon, a fluid processor including a nozzle having a doctoring surface for forming a generally uniform processing fluid layer on at least the emulsion surface as the film travels therepast in a given direction of film advancement, and a pressure pad assembly spaced relative to said nozzle and including a spring biased pressure pad which yieldably supports the film with the emulsion surface in spaced relation to the doctoring surface, the improvement comprising:

said nozzle having a pad engaging surface spaced laterally beyond each of the longitudinal margins of the film strip and constructed to engage said pressure pad as the film strip travels between said pad and said nozzle;

nozzle engaging surfaces defined by said pad for engaging said pad engaging surfaces of said nozzle so that the spacing of the emulsion surface relative to said doctoring surface is defined by said engaging surfaces; and a film supporting member on said pad located between said nozzle engaging surfaces and being spaced from a plane defined by said nozzle engaging surfaces, said engaging surfaces and said spaced supporting member coacting with the film during travel of the film in the given direction so that thickness variations of the film will not cause said pad to substantially move towards or away from said nozzle to thereby substantially avoid altering the preselected spacing between the emulsion surface and the doctoring surface.

2. The method of supporting a strip of photographic film having an emulsion surface by a pressure pad as the film travels in a given direction in a photographic film cassette so that the emulsion surface of the film passes a cassette contained fluid processor nozzle having an opening for depositing the processing fluid on the emulsion surface and a doctoring blade positioned downstream of the opening in the given direction and being spaced a predetermined distance from the emulsion surface so as to blade the deposited fluid over the emulsion surface to define thereover a predetermined uniform layer of the processing fluid, the improvement comprising the step of:

supporting successive incremental portions of the film by the pressure pad between the nozzle and the pad in such a manner that the pad directly engages the nozzle beyond each longitudinal margin of the film strip and the pad also engages the film strip intermediate the longitudinal margins so that the film is in the predetermined spaced relation to the doctoring blade for substantially preventing thickness variations of the film from causing the pressure pad and thereby the film to substantially move towards or away from the doctoring blade and thereby vary said predetermined spacing.

3. In a film cassette containing a movable strip of photographic film having an emulsion surface thereon, a fluid processor including a nozzle having a doctoring surface for forming a generally uniform processing fluid layer on at least the emulsion surface as the film travels therepast in a given direction of film advancement, and a pressure pad assembly spaced relative to said nozzle and including a spring biased pressure pad which yieldably supports the film with the emulsion surface in spaced relation to the doctoring surface, the improvement comprising:

said nozzle having a pad engaging surface spaced laterally beyond each of the longitudinal margins of the film strip and constructed to engage said pressure pad as the film strip travels between said pad and said nozzle;

nozzle engaging surfaces defined by said pad for engaging said pad engaging surfaces of said nozzle so that the spacing of the emulsion surface relative to said doctoring surface is defined by said engaging surfaces;

a film supporting member on said pad located between said nozzle engaging surfaces and being spaced from a plane defined by said nozzle engaging surfaces, said engaging surfaces and said spaced supporting member coacting with the film during travel of the film in the given direction so that thickness variations of the film will not cause said pad to substantially move towards or away from said nozzle to thereby substantially avoid altering the preselected spacing between the emulsion surface and the doctoring surface; and said film supporting member supports only the film strip between the film's longitudinal margins so that the film's longitudinal margins are spaced from said pad for reducing friction on the movable film strip.

4. In a film cassette containing a movable strip of photographic film having an emulsion surface thereon, a fluid processor including a nozzle having a doctoring surface for forming a generally uniform processing fluid layer on at least the emulsion surface as the film travels therepast in a given direction of film advancement, and a pressure pad assembly spaced relative to said nozzle and including a spring biased pressure pad which yieldably supports the film with the emulsion surface in spaced relation to the doctoring surface, the improvement comprising:

said nozzle having a pad engaging surface spaced laterally beyond each of the longitudinal margins of the film strip and constructed to engage said pressure pad as the film strip travels between said pad and said nozzle;

nozzle engaging surfaces defined by said pad for engaging said pad engaging surfaces of said nozzle so that the spacing of the emulsion surface relative to said doctoring surface is defined by said engaging surfaces;

a film supporting member on said pad located between said nozzle engaging surfaces and being spaced from a plane defined by said nozzle engaging surfaces, said engaging surfaces and said spaced supporting member coacting with the film during travel of the film in the given direction so that thickness variations of the film will not cause said pad to substantially move towards or away from said nozzle to thereby substantially avoid altering the preselected spacing between the emulsion surface and the doctoring surface; and said film supporting member supports only the film strip between the film's longitudinal margins so that clearance exists between said pad and edge rails formed on the longitudinal margins.

5. The method of supporting a strip of photographic film having an emulsion surface by a pressure pad as the film travels in a given direction in a photographic film cassette so that the emulsion surface of the film passes a cassette contained fluid processor nozzle having an opening for depositing the processing fluid on the emulsion surface and a doctoring blade positioned downstream of the opening in the given direction and being spaced a predetermined distance from the emulsion surface so as to blade the deposited fluid over the emulsion surface to define thereover a predetermined uniform layer of the processing fluid, the improvement comprising the step of:

supporting successive incremental portions of the film by the pressure pad between the nozzle and the pad in such a manner that the pad directly engages the nozzle beyond each longitudinal margin of the film strip and the pad also engages the film strip intermediate the longitudinal margins so that the film is in the predetermined spaced relation to the doctoring blade for substantially preventing thickness variations of the film from causing the pressure pad and thereby the film to substantially move towards or away from the doctoring blade and thereby vary said predetermined spacing, said step of supporting the film strip is achieved by supporting the film strip in such a manner that the longitudinal margins are spaced from the pad for thereby reducing friction.

6. The method of supporting a strip of photographic film having an emulsion surface by a pressure pad as the film travels in a given direction in a photographic film cassette so that the emulsion surface of the film passes a cassette contained fluid processor nozzle having an opening for depositing the processing fluid on the emulsion surface and a doctoring blade positioned downstream of the opening in the given direction and being spaced a predetermined distance from the emulsion surface so as to blade the deposited fluid over the emulsion surface to define thereover a predetermined uniform layer of the processing fluid, the improvement comprising the step of:

supporting successive incremental portions of the film by the pressure pad between the nozzle and the pad in such a manner that the pad directly engages the nozzle beyond each longitudinal margin of the film strip and the pad also engages the film strip intermediate the longitudinal margins so that the film is in the predetermined spaced relation to the doctoring blade for substantially preventing thickness variations of the film from causing the pressure pad and thereby the film to substantially move towards or away from the doctoring blade and thereby vary said predetermined spacing, said step of supporting the film strip is achieved by supporting the film strip in such a manner that edge rails on the longitudinal margins have a clearance with the pad for reducing friction.

* * * * *